(12) United States Patent
Chen (10) Patent No.: US 9,282,225 B2
(45) Date of Patent: Mar. 8, 2016

(54) STAND FOR IP CAMERA AND IP CAMERA HAVING THE SAME, AND USING METHOD THEREOF

(71) Applicant: Sercomm Corporation, Tapei (TW)

(72) Inventor: Chia-An Chen, New Taipei (TW)

(73) Assignee: SERCOMM CORPORATION, Tapei (TW)

( * ) Notice: Subject to any disclaimer, the term of this patent is extended or adjusted under 35 U.S.C. 154(b) by 80 days.

(21) Appl. No.: 13/955,054

(22) Filed: Jul. 31, 2013

(65) Prior Publication Data

US 2015/0002736 A1 Jan. 1, 2015

(30) Foreign Application Priority Data

Jun. 26, 2013 (CN) .......................... 2013 1 0260281

(51) Int. Cl.
*H04N 5/225* (2006.01)
*G03B 17/56* (2006.01)
*F16M 11/22* (2006.01)

(52) U.S. Cl.
CPC ............. *H04N 5/2251* (2013.01); *F16M 11/22* (2013.01); *G03B 17/56* (2013.01); *F16M 2200/08* (2013.01)

(58) Field of Classification Search
CPC ... H04N 5/2252; H04N 1/00127; H02G 3/30; H02G 3/32; G03B 2215/0517; G02B 6/3879; G02B 6/3887
USPC .................................... 348/373; 248/68.1, 49
See application file for complete search history.

(56) References Cited

U.S. PATENT DOCUMENTS

| 7,551,432 B1* | 6/2009 | Bockheim et al. ........ 361/679.07 |
| 2006/0238966 A1 | 10/2006 | Sung |
| 2009/0174760 A1* | 7/2009 | Basmadjian et al. ...... 348/14.01 |
| 2011/0147542 A1* | 6/2011 | Hoek ........................... 248/68.1 |
| 2012/0074006 A1* | 3/2012 | Monaco et al. ................ 206/320 |
| 2012/0325701 A1* | 12/2012 | Debitzky ...................... 206/320 |

FOREIGN PATENT DOCUMENTS

| CN | 1856231 A | 11/2006 |
| CN | 202306391 U | 7/2012 |
| CN | 102705587 A | 10/2012 |

OTHER PUBLICATIONS

Sole Fitness—Owner's Manual, Sep. 7, 2012; www.soleellipticals. com; p. 6—ite, #75.*
CN Office Action dated Dec. 2, 2014.

(Continued)

*Primary Examiner* — James Hannett
*Assistant Examiner* — Padma Haliyur
(74) *Attorney, Agent, or Firm* — McClure, Qualey & Rodack, LLP (57) ABSTRACT

A stand for an IP camera is provided. The stand comprises a base, a supporting component and a cable organizer. The supporting component is disposed on the base and has a hole. The cable organizer is configured for being inserted into the hole. The cable organizer has a first surface, a second surface and a side surface, wherein the second surface is opposite to the first surface, and the side surface connects the first surface with the second surface. The cable organizer comprises at least one through hole portion. The through hole portion has a slit that allows a cable to be received through and organized in the through hole portion by passing through the slit. An IP camera having the stand and a using method of the stand are also provided.

13 Claims, 6 Drawing Sheets

(56) References Cited

OTHER PUBLICATIONS

English Abstract translation of CN102705587 (Published Oct. 3, 2012).

English Abstract translation of CN202306391 (Published Jul. 4, 2012).

* cited by examiner

STAND FOR IP CAMERA AND IP CAMERA HAVING THE SAME, AND USING METHOD THEREOF

This application claims the benefit of People's Republic of China application Serial No. 201310260281.X, filed on Jun. 26, 2013, the disclosure of which is incorporated by reference herein in its entirety.

BACKGROUND

1. Technical Field

Embodiments of the present invention generally relate to an IP camera. More particularly, this invention relates to a stand that allows for organizing a cable/cables of an IP camera, an IP camera having the same, and a using method thereof.

2. Description of the Related Art

IP cameras have been widely used. For example, one application is home security. Generally, an IP camera is used together with an external power supply, connecting cables, or the like. However, the IP camera of prior art does not provides a structure that allows for organizing these cables. As such, an IP camera may need to be further improved in its appearance, use, or even safety for users (since one may stumble over disorderly cables).

SUMMARY

A stand for an IP camera that allows for organizing a cable/cables of the IP camera is provided. An IP camera having such a stand is provided. A using method of the stand is also provided.

In one aspect, a stand for an IP camera is provided. The stand comprises a base, a supporting component and a cable organizer. The supporting component is disposed on the base and has a hole. The cable organizer is configured for being inserted into the hole. The cable organizer has a first surface, a second surface and a side surface, wherein the second surface is opposite to the first surface, and the side surface connects the first surface with the second surface. The cable organizer comprises at least one through hole portion. The through hole portion has a slit that allows a cable to be received through and organized in the through hole portion by passing through the slit.

In another aspect, an IP camera is provided. The IP camera comprises a camera and a stand for supporting the camera. Here, the stand has a structure as described above.

In still another aspect, a using method of a stand of an IP camera is provided. The method comprises deciding the type of a cable organizer used in the stand of the IP camera based on the position of a cable connection part of the IP camera. The cable organizer comprises at least one through hole portion, the through hole portion has a slit that allows a cable to be received through and organized in the through hole portion by passing through the slit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures, and similar reference numerals have been used, where possible, to designate similar elements. Further, some elements and reference numerals may be removed from some of the drawings for clarity. It is contemplated that elements and features of one embodiment may be beneficially incorporated in other embodiments without further recitation.

DETAILED DESCRIPTION

Various embodiments of a stand allowing for organizing a cable/cables of an IP camera, an IP camera having such a stand, and a using method of such a stand are described below in detail.

Figure 1A:
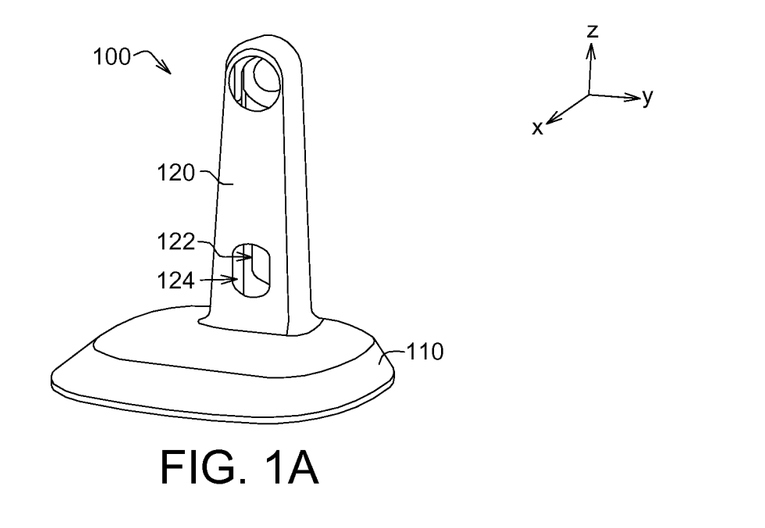
FIGS. 1A-1B show a stand for an IP camera according to one embodiment.
Figure 1B:
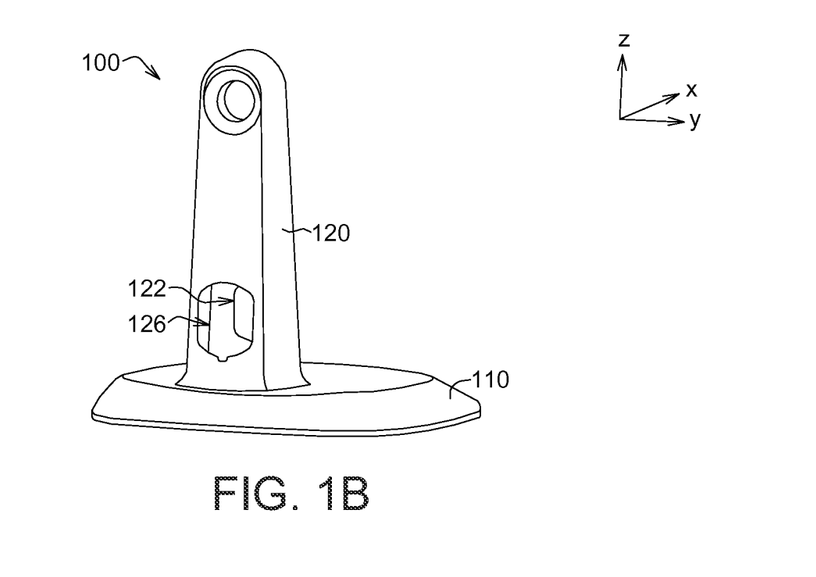

FIGS. 1A-1B show a stand 100 for an IP camera according to one embodiment. The stand 100 comprises a base 110, a supporting component 120 and a cable organizer (such as the cable organizer 130 shown in FIG. 2, or the cable organizer 230 shown in FIG. 4). The supporting component 120 is disposed on the base 110 to support the camera (such as the camera 200 of the IP camera 10 shown in FIG. 3A) of the IP camera. The supporting component 120 has a hole 122. The cable organizer is configured for being inserted into the hole 122. As such, the cable organizer has a shape matching the aperture of the hole. The hole 122 has a first end 124 and a second end 126. In the example shown in FIGS. 1A-1B, the first end 124 is the end of the hole 122 at the front surface of the supporting component 120, and the second end 126 is the end of the hole 122 at the rear surface of the supporting component 120. However, the positions of the ends are not limited thereto. In some embodiments, an area of the second end 126 may be larger than an area of the first end 124. As such, the corresponding cable organizer has a larger end and a smaller end, thereby provides a foolproof design.

Figure 2:
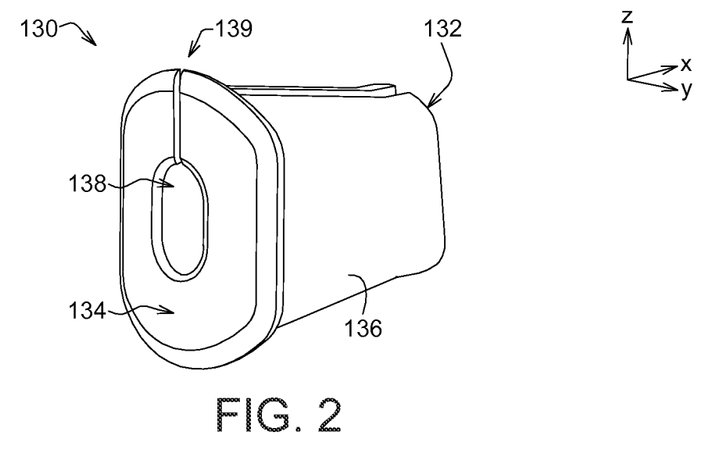
FIG. 2 shows a cable organizer used in a stand for an IP camera according to one embodiment.

FIG. 2 shows a cable organizer 130 according to one embodiment. The cable organizer 130 may be used in the stand 100 for an IP camera.

The cable organizer 130 has a first surface 132, a second surface 134 and a side surface 136, wherein the second surface 134 is opposite to the first surface 132, and the side surface 136 connects the first surface 132 with the second surface 134. The first surface 132 and the second surface 134 of the cable organizer 130 correspond to the first end 124 and the second end 126 of the hole 122, respectively. In the case that an area of the second end 126 is larger than an area of the first end 124, an area of the second surface 134, which corresponds to the second end 126, is larger than an area of the first surface 132, which corresponds to the first end 124. Thus, in such a case, the user will not insert the cable organizer 130 into the hole 122 from a wrong direction. As such, a foolproof design of the stand is provided. In some embodiments, an area of the second surface 134 of the cable organizer 130 may be larger than a cross-sectional area of the hole 122, such as the area of the second end 126. As such, a portion of the cable organizer 130 is outside the hole 122, and thereby the position of the cable organizer 130 can be fixed.

The cable organizer 130 comprises at least one through hole portion 138. The through hole portion 138 has a slit 139 that allows a cable (such as the cables 300 shown in FIG. 3A) to be received through and organized in the through hole portion 138 by passing through the slit 139. Here, the through hole portion 138 is formed through the cable organizer 130 from the first surface 132 to the second surface 134, and the slit 139 is cut from the side surface 136 into the through hole portion 138 to allow the cable to pass through the cable organizer 130 through the through hole portion 138. Although one through hole portion 138 is shown in FIG. 2, as will be understood by a person skilled in the art, the number of the through hole portion 138 may be decided according to the number of the cables to be received therein. Further, the shape and the size of the through hole may be decided depending on the cable/cables to be received therein. For example, if a pair of cables that are bonded to each other side by side are to be received, the cable organizer 130 may comprise only one through hole portion 138, however, the through hole of this through hole portion 138 is large enough to allow the two cables to be received together in the through hole.

In some embodiments, the cable organizer 130 may be made of an elastic material, such as rubber, such that the cable organizer 130 can be inserted into and pulled out from the hole 122 easily. However, the material of the cable organizer 130 is not limited to the elastic material. Non-elastic material may be used in the case that the interior configuration of the hole 122 is modified to, for example, having threads, just like the internal of a screw nut.

FIGS. 3A-3D show a method of using a cable organizer to organize cables of an IP camera according to one embodiment. In the example shown in FIGS. 3A-3D, the cable organizer 130 as shown in FIG. 2 is used based on the structure of a camera 200 of an IP camera 10.

Figure 3A:
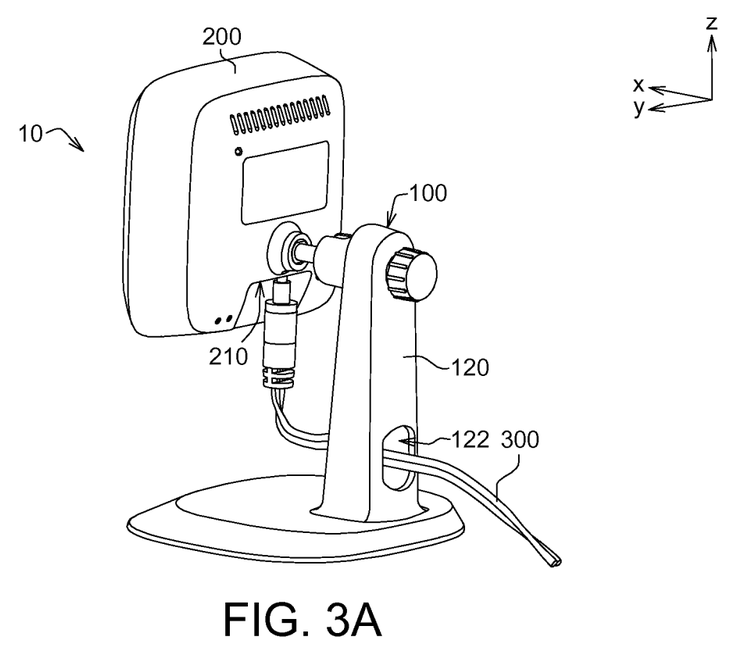
FIGS. 3A-3D show a method of using a cable organizer to organize cables of an IP camera according to one embodiment.

Referred to FIG. 3A, the IP camera 10 comprises a camera 200 and a stand 100 for supporting the camera 200, wherein the camera 200 is supported by the supporting component 120 of the stand 100. The camera 200 comprises a cable connection part 210, such as a USB port, a power port, or other ports commonly used in electronic devices. In the example of the IP camera 10, the position of the cable connection part 210 of the camera 200 is near the bottom of the camera 200.

Here, as shown in FIG. 3A, cables 300 are passed through the hole 122 of the stand 100. Further, after the cables 300 have been passed through the hole 122, the cables 300 are connected to the cable connection part 210 of the IP camera 10.

Figure 3B:
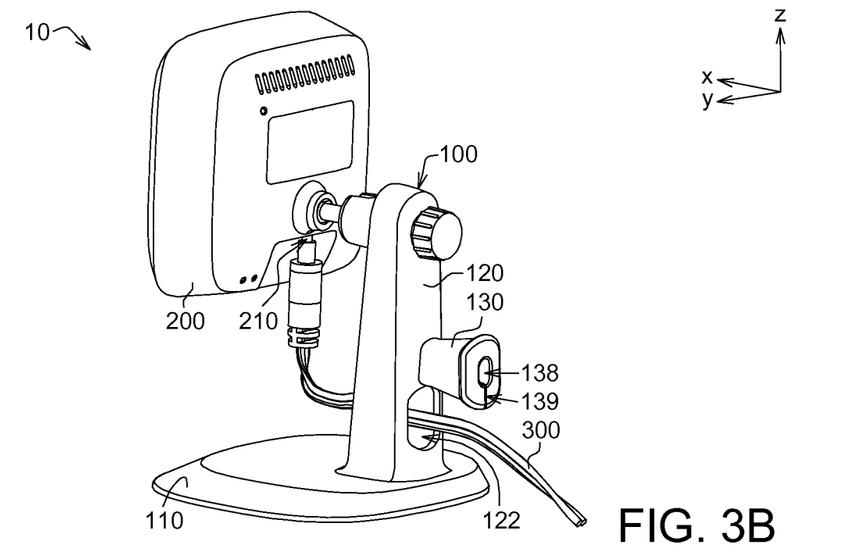

As shown in FIG. 3B, the type of a cable organizer used in the stand 100 of the IP camera 10 is decided based on the position of the cable connection part 210 of the IP camera 10. Since the position of the cable connection part 210 is near the bottom of the camera 200, the cable organizer 130 as shown in FIG. 2 is suitable for the IP camera 10.

The cable organizer 130 comprises the through hole portion 138. The through hole portion 138 has the slit 139, such that cables 300 corresponding to the cable connection part 210 can be received through and organized in the through hole portion 138 by passing through the slit 139.

Figure 3C:
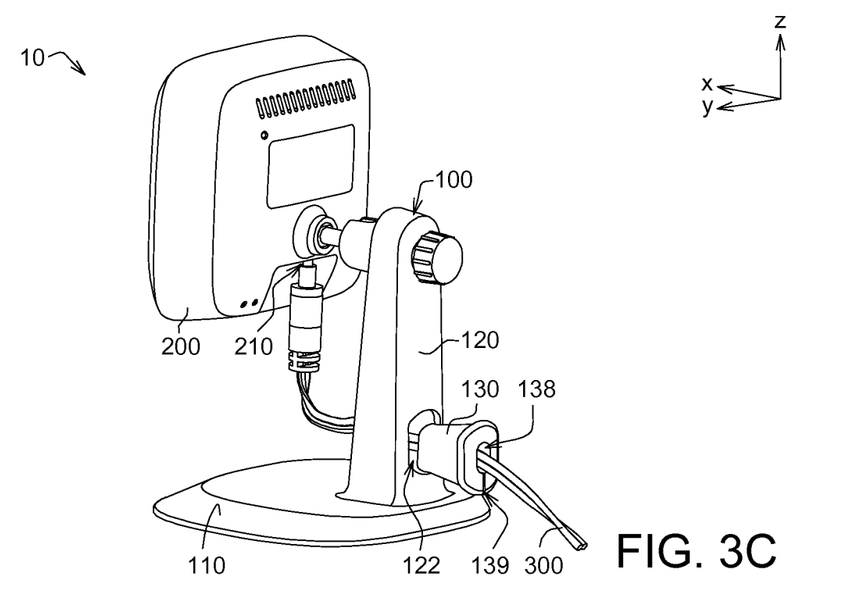

As shown in FIG. 3C, through the slit 139 of the cable organizer 130, the cables 300 are received in the through hole portion 138, and thereby the cables 300 pass the cable organizer 130 through the through hole portion 138.

Figure 3D:
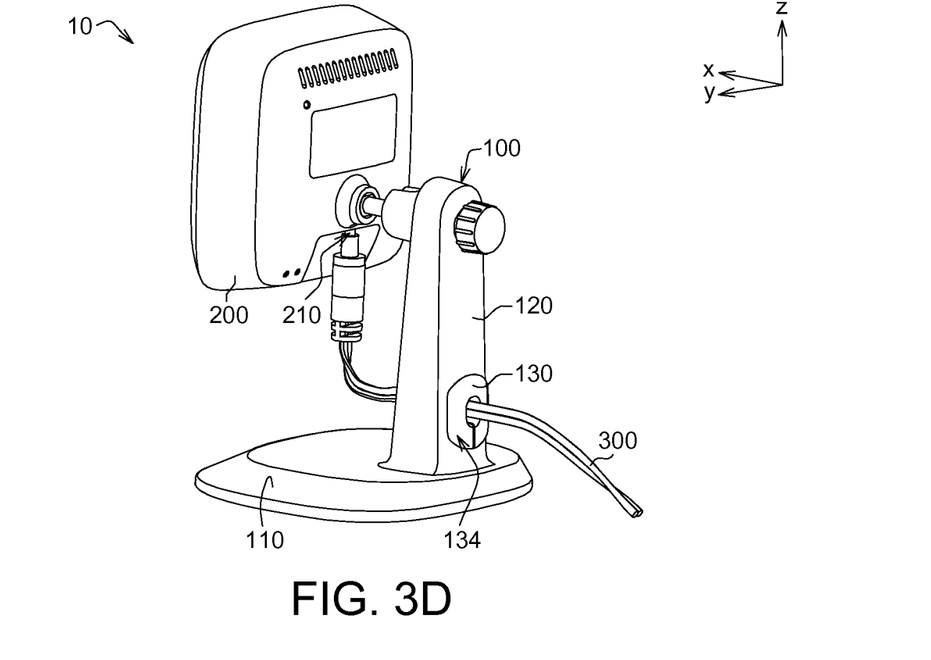

Finally, as shown in FIG. 3D, the cable organizer 130 is inserted into the hole 122 (shown in FIG. 3C) of the stand 100, such that the positions of the cables 300 connecting to the IP camera 10 are substantially fixed relative to the IP camera 10.

In the example shown in FIGS. 3A-3D, an area of the second end 126 (shown in FIG. 1B) of the hole 122 is larger than an area of the first end 124 (shown in FIG. 1A) of the hole 122, and an area of the second surface 134 of the cable organizer 130 is larger than an area of the first surface 132 (shown in FIG. 2) of the cable organizer 130. As such, the user will not insert the cable organizer 130 into the hole 122 from a wrong direction.

Further, in the example shown in FIGS. 3A-3D, an area of the second surface 134 of the cable organizer 130 is larger than an area of the second end 126 (shown in FIG. 1B) of the hole 122. As such, the cable organizer 130 will not be completely inserted into the hole 122, a portion of the cable organizer 130 that near the second surface 134 is left outside the hole 122, and thereby the position of the cable organizer 130 is substantially fixed relative to the supporting component 120.

Figure 4:
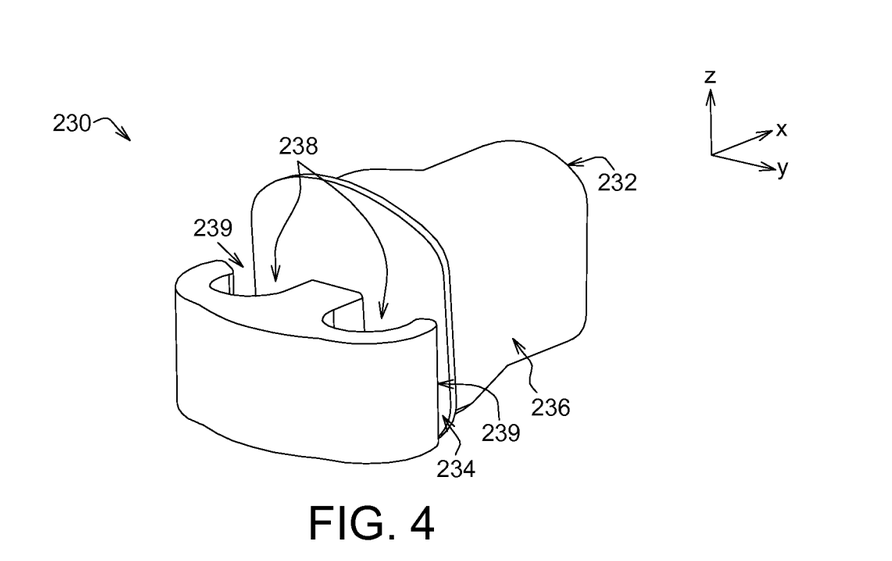
FIG. 4 shows a cable organizer used in a stand for an IP camera according to another embodiment.

The cable organizer may have a structure different from that of the cable organizer 130 shown in FIG. 2 to be used for IP cameras having structures different from that of the IP camera 10. FIG. 4 shows a cable organizer 230 used in the stand 100 for an IP camera according to another embodiment.

The cable organizer 230 has a first surface 232, a second surface 234 and a side surface 236, wherein the second surface 234 is opposite to the first surface 232, and the side surface 236 connects the first surface 232 with the second surface 234. The first surface 232 and the second surface 234 of the cable organizer 230 correspond to the first end 124 and the second end 126 of the hole 122, respectively. Similar to the cable organizer 130, in some embodiments, an area of the second surface 234, which corresponds to the second end 126, may be larger than an area of the first surface 232, which corresponds to the first end 124. As such, a foolproof design of the stand is provided. In some embodiments, an area of the second surface 234 of the cable organizer 230 may be larger than a cross-sectional area of the hole 122, such as the area of the second end 126. As such, a portion of the cable organizer 230 is outside the hole 122, and thereby the position of the cable organizer 230 can be fixed.

The cable organizer 230 comprises at least one through hole portion 238. The through hole portion 238 has a slit 239 that allows a cable to be received through and organized in the through hole portion 238 by passing through the slit 239. Here, the through hole portion 238 is formed through the cable organizer 230 substantially along the second surface 234 of the cable organizer 230, and the slit 239 is cut into the through hole portion 238 along the second surface 234 to allows the cable (such as the cables 300 shown in FIG. 5C) to be held on the second surface 234 through the through hole portion 238. Here, the slit 239 cut along the second surface 234 may not be formed next to the second surface 234. The slit 239 may be formed at any part of the through hole portion 238 as long as the slit 239 allows the cable to be received through and organized in the through hole portion 238 and further be held on the second surface 234 by passing through the slit 239. As shown in FIG. 4, two through hole portions 238 are disposed to respectively receive one of the two separate cables. However, as will be understood by a person skilled in the art, the number, shape and size of the through hole portion 238 may be decided according to the cable/cables to be received therein, and the structure of the through hole portion 238 is not limited to that shown in FIG. 4.

Further, in some embodiments, the cable organizer 230 may be made of an elastic material, such as rubber, such that the cable organizer 230 may be inserted into and pulled out from the hole 122 easily. However, the material of the cable organizer 230 is not limited to the elastic material.

FIGS. 5A-5D show a method of using a cable organizer to organize cables of an IP camera according to another embodiment. In the example shown in FIGS. 5A-5D, the cable organizer 230 as shown in FIG. 4 is used based on the structure of a camera 400 of an IP camera 20.

Figure 5A:
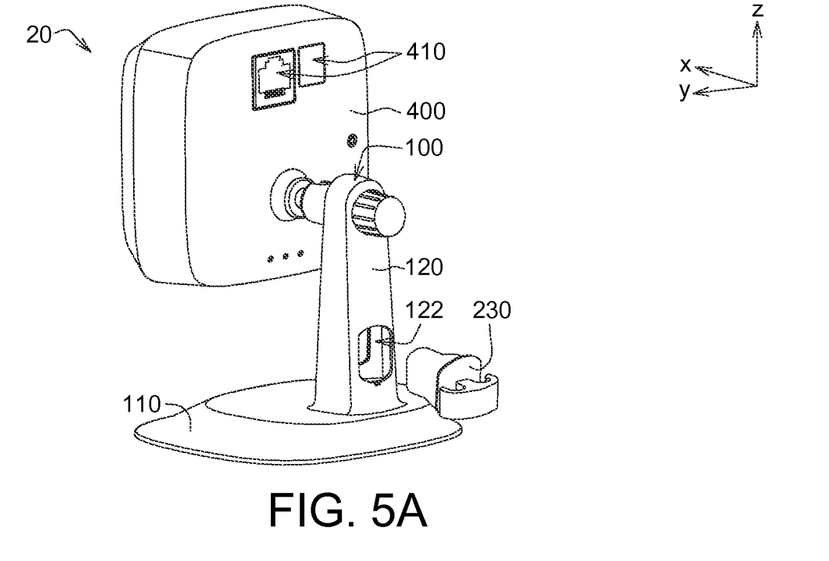
FIGS. 5A-5D show a method of using a cable organizer to organize cables of an IP camera according to another embodiment.

Referred to FIG. 5A, the IP camera 20 comprises a camera 400 and a stand 100 for supporting the camera 400, wherein the camera 400 is supported by the supporting component 120 of the stand 100. The camera 400 comprises a cable connection part 410, such as a USB port, a power port, or other ports commonly used in electronic devices. In the example of the IP camera 20, the position of the cable connection part 410 of the camera 400 is on an upper portion of the rear side of the camera 400.

Here, the type of a cable organizer used in the stand 100 of the IP camera 20 is decided based on the position of the cable connection part 410 of the IP camera 20. Since the position of the cable connection part 410 is on an upper portion of the rear side of the camera 400, the cable organizer 230 as shown in FIG. 4 is suitable for the IP camera 20.

Figure 5B:
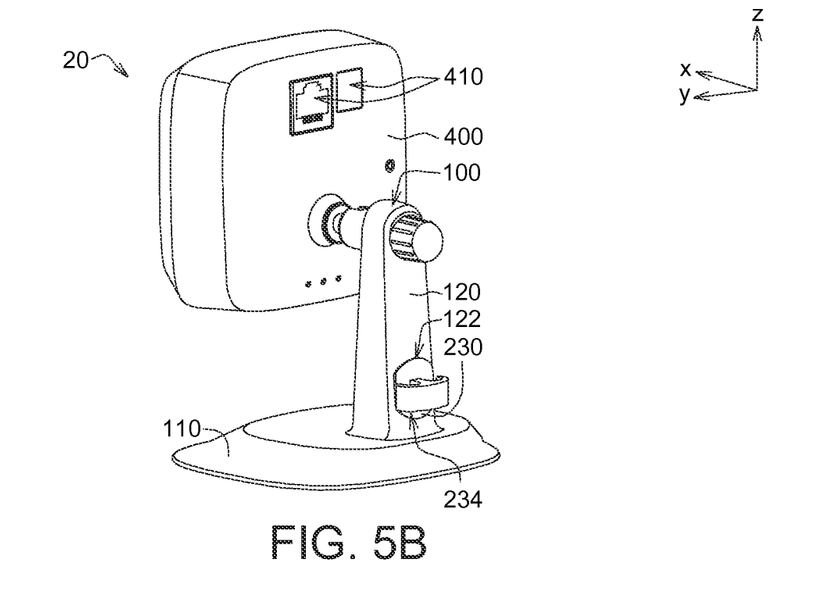

Referred to FIG. 5B, the cable organizer 230 is inserted into the hole 122 of the stand 100. In the example shown in FIGS. 5A-5D, an area of the second end 126 (shown in FIG. 1B) of the hole 122 is larger than an area of the first end 124 (shown in FIG. 1A) of the hole 122, and an area of the second surface 234 of the cable organizer 230 is larger than an area of the first surface 232 (shown in FIG. 4) of the cable organizer 230. As such, the user will not insert the cable organizer 230 into the hole 122 from a wrong direction. In addition, in the example shown in FIGS. 5A-5D, an area of the second surface 234 of the cable organizer 230 is larger than an area of the second end 126 (shown in FIG. 1B) of the hole 122. As such, a portion of the cable organizer 230 that near the second surface 234 is left outside the hole 122, and thereby the position of the cable organizer 230 is substantially fixed relative to the supporting component 120.

Figure 5C:
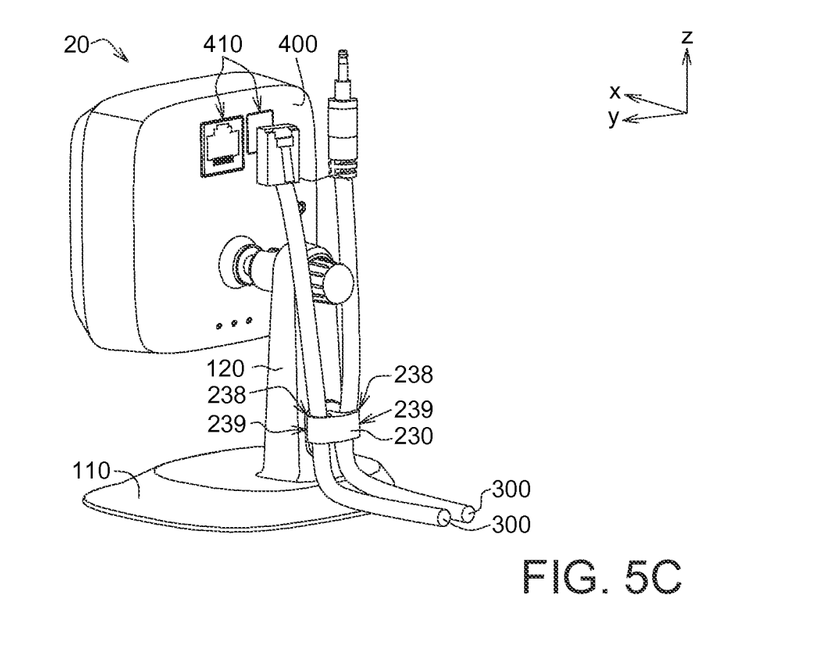

Referred to FIG. 5C, after the cable organizer 230 is inserted into the hole 122, the cables 300 can be received into the through hole portion 238 through the slit 239, such that the cables 300 is held on a surface of the cable organizer 230 through the through hole portion 238.

Figure 5D:
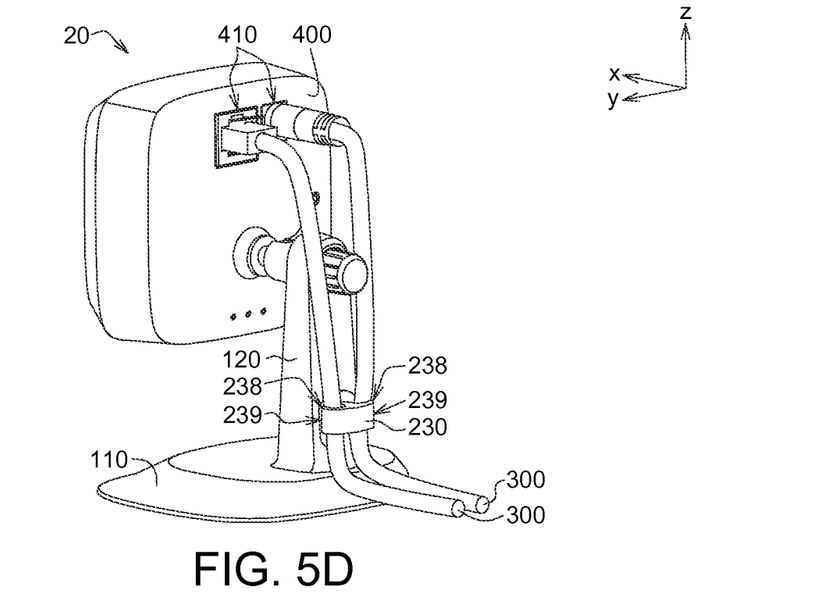

Referred to FIG. 5D, after the cables 300 have been received in the through hole portion 238 and held on a surface (the second surface 234 in the example shown in FIG. 5D) of the cable organizer 230, and thereby the positions of the cables 300 to be connected to the IP camera 20 are substantially fixed relative to the IP camera 20, the cables 300 may be connected to the cable connection part 410 of the IP camera 20.

As illustrated in the embodiments described above, the stand for an IP camera of the presented invention provides a structure that allows a user to easily organize the cables therein. As such, the appearance, use, safety for users, etc., of a stand for an IP camera is improved according to this invention.

Further, the cable organizer may be changed according to the position of the cable connection part of the camera. As such, the same stand may be used for cameras of different types, as described in the examples illustrated with respect to FIGS. 3A-3D and 5A-5D. Additionally or alternatively, the same cable organizer may be used in stands of different types as long as the hole of same structure is formed in each of the stands. The stand of the present invention is beneficial for unification of the stands for IP cameras. As such, only a single mold is needed in the manufacturing process, and thus the process may be simplified and the cost may be decrease. Besides, it is not needed to change the stand when change the camera, making it more convenient for the users. Other than the IP camera, the stand of this invention may be used for a digital camera, a cell phone, a portable audio player, a PC speaker, a display, an illuminating device, or the like.

In addition, in the case that the cable organizer is made of rubber, the manufacturing process is simple and the cost is low. Further, since the rubber is easy to be dyed, cable organizers of different colors may be provided. The cable organizers of different colors can be used for different types of IP cameras or used in different regions where IP cameras are set, and thereby the IP cameras can be classified. Alternatively, a user may choose a cable organizer having the color he or she likes. As such, the cable organizers are personalized.

While the foregoing is directed to embodiments of the present invention, other and further embodiments of the invention may be devised without departing from the basic scope thereof, and the scope thereof is determined by the claims that follow.

What is claimed is:

1. A stand for an IP camera, comprising:
   a base;
   a shaft;
   a supporting component standing on the base and configured to hold the IP camera, the supporting component including two end portions and a long portion located between the two end portions, the shaft connecting the supporting component and the IP camera, the hole being disposed between the hinge and the base, the supporting component having a hole penetrating through two opposite elongated surfaces of the long portion; and
   a cable organizer, wherein the cable organizer is configured for being inserted into the hole of the long portion such that the cable organizer crosses the long portion, the cable organizer has a first surface, a second surface and a side surface, the second surface is opposite to the first surface, the side surface connects the first surface with the second surface, the cable organizer comprises at least one through hole portion, the through hole portion has a slit that allows a cable to be received through and organized in the through hole portion by passing through the slit, the hole has a first end and a second end corresponding to the first surface and the second surface, respectively, an area of the second end is larger than an area of the first end, the cable organizer includes a board portion and a body portion connected to the board portion, a cross-sectional area of one end of the body portion is larger than a cross-sectional area of anther end of the body portion, and the supporting component is a pillar.

2. The stand of claim 1, wherein the cable organizer is made of an elastic material, and the cable organizer penetrates through the two opposite elongated surfaces of the long portion along a direction perpendicular to the long portion.

3. The stand of claim 2, wherein the elastic material is rubber.

4. The stand of claim 1, wherein the through hole portion is formed through the cable organizer from the first surface to the second surface, and the slit is cut from the side surface into the through hole portion to allow the cable to pass through the cable organizer through the through hole portion.

5. The stand of claim 1, wherein the through hole portion is formed through the cable organizer substantially along the second surface, and the slit is cut into the through hole portion along the second surface to allow the cable to be held on the second surface through the through hole portion.

6. The stand of claim 5, wherein the number of the at least one through hole portion is two.

7. The stand of claim 1, wherein an area of the second surface is larger than a cross-sectional area of the hole such that a portion of the cable organizer is located outside the hole.

8. An IP camera, comprising:
a camera; and
a stand for supporting the camera, the stand comprising:
a base;
a shaft;
a supporting component standing on the base and supporting the camera, the supporting component including two end portions and a long portion located between the two end portions, the shaft connecting the supporting component and the IP camera, the hole being disposed between the hinge and the base, the supporting component having a hole penetrating through two opposite elongated surfaces of the long portion; and
a cable organizer, wherein the cable organizer is configured for being inserted into the hole of the long portion, such that the cable organizer crosses the long portion, the cable organizer has a first surface, a second surface and a side surface, the second surface is opposite to the first surface, the side surface connects the first surface with the second surface, the cable organizer comprises at least one through hole portion, the through hole portion has a slit that allows a cable to be received through and organized in the through hole portion by passing through the slit, the hole has a first end and a second end corresponding to the first surface and the second surface, respectively, an area of the second end is larger than an area of the first end, the cable organizer includes a board portion and a body portion connected to the board portion, a cross-sectional area of one end of the body portion is larger than a cross-sectional area of anther end of the body portion, and the supporting component is a pillar.

9. The IP camera of claim 8, wherein the cable organizer is made of an elastic material, and the cable organizer penetrates through the two opposite elongated surfaces of the long portion along a direction perpendicular to the long portion.

10. The IP camera of claim 9, wherein the elastic material is rubber.

11. The IP camera of claim 8, wherein the through hole portion is formed through the cable organizer from the first surface to the second surface, and the slit is cut from the side surface into the through hole portion to allow the cable to pass through the cable organizer through the through hole portion.

12. The IP camera of claim 8, wherein the through hole portion is formed through the cable organizer substantially along the second surface, and the slit is cut into the through hole portion along the second surface to allow the cable to be held on the second surface through the through hole portion.

13. The IP camera of claim 12, wherein the number of the at least one through hole portion is two.

* * * * *